United States Patent [19]

Suzuki

[11] Patent Number: 4,653,941
[45] Date of Patent: Mar. 31, 1987

[54] IMPACT DOT MATRIX PRINTER

[75] Inventor: Kuniaki Suzuki, Tokyo, Japan

[73] Assignee: Kabushiki Kaisha Toshiba, Japan

[21] Appl. No.: 770,999

[22] Filed: Aug. 30, 1985

[30] Foreign Application Priority Data

Aug. 31, 1984 [JP] Japan .............................. 59-181869
Aug. 31, 1984 [JP] Japan .............................. 59-181873

[51] Int. Cl.⁴ ............................................... B41J 3/12
[52] U.S. Cl. ..................................... 400/121; 400/54; 400/124
[58] Field of Search ................. 400/54, 121, 124, 322, 400/323; 101/93.04

[56] References Cited

U.S. PATENT DOCUMENTS 4,284,362  8/1981  Jackson .............................. 400/124

FOREIGN PATENT DOCUMENTS 2402858  7/1975  Fed. Rep. of Germany ...... 400/121
3125426  1/1983  Fed. Rep. of Germany ...... 400/121
3336597  4/1984  Fed. Rep. of Germany ...... 400/121
  64569  4/1982  Japan ................................. 400/121
  71174  4/1983  Japan ................................. 400/121
  16765  1/1984  Japan ................................. 400/54
  48166  3/1984  Japan ................................. 400/124

OTHER PUBLICATIONS

*IBM Tech. Disc. Bulletin*, by B. R. Cavill, vol. 24, No. 11A, Apr. 1982, pp. 5430–5432.

Primary Examiner—Paul T. Sewell
Attorney, Agent, or Firm—Finnegan, Henderson, Farabow, Garrett & Dunner

[57] ABSTRACT

An impact dot matrix printer is disclosed in which a print head consisting of an array of dot pins constituted by wires arranged in a vertical direction faces a printing sheet via an ink ribbon and is reciprocable along a horizontal direction. While the print head is moved reciprocally, the dot pin array is driven according to printing data to print a dot pattern consisting of a plurality of dots in a dot matrix, the printing sheet being fed by one line pitch in a vertical direction after printing of each line. The printer comprises first detecting means for detecting the position of the print head during reciprocating, second detecting means for detecting the number of cycles of movement of the print head executed during printing of a dot pattern for one line, means for judging whether to permit dot printing according to the outputs of the first and second detecting means, driver means for driving the print head according to the output of the judging means and printing data, and a sheet feeding mechanism for feeding the printing sheet in the vertical direction for every N cycle (N being a positive integer) of the print head.

12 Claims, 24 Drawing Figures

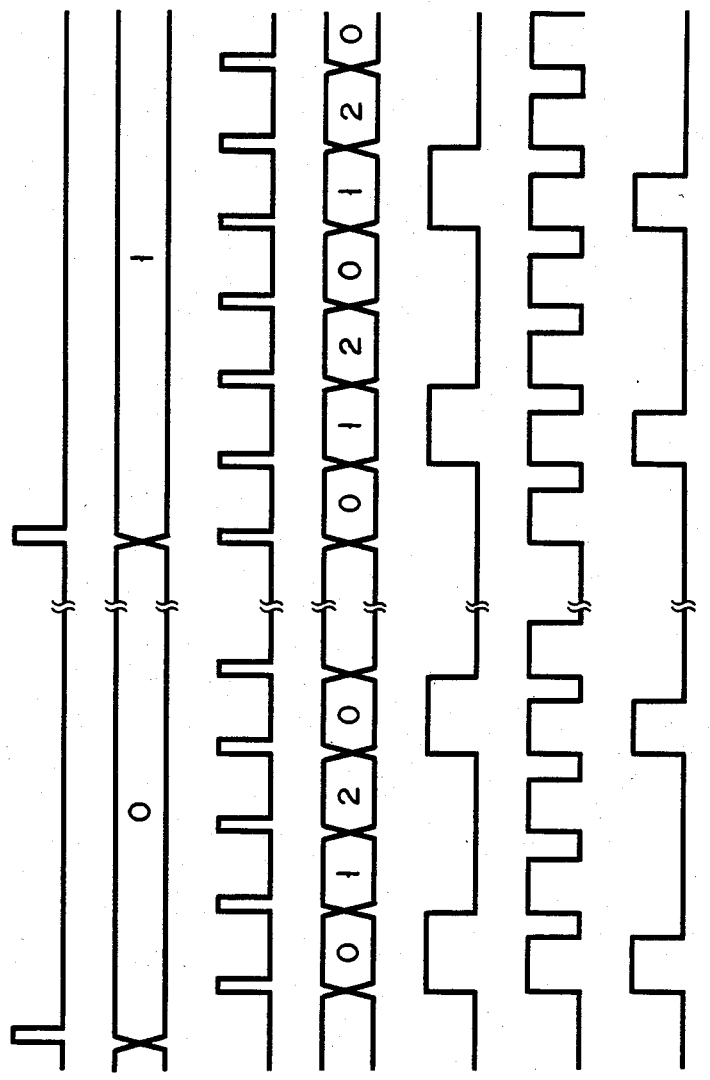

F I G. 5
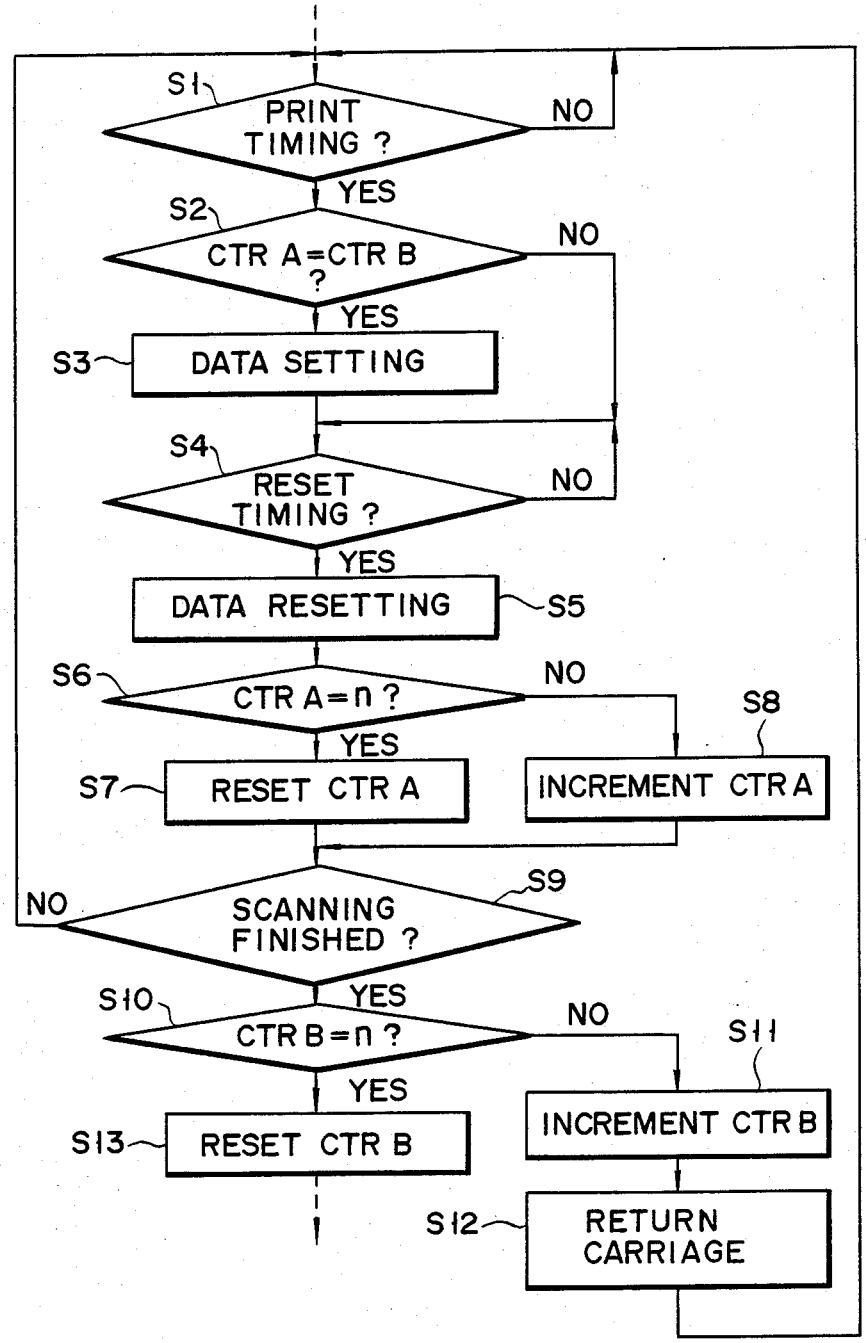

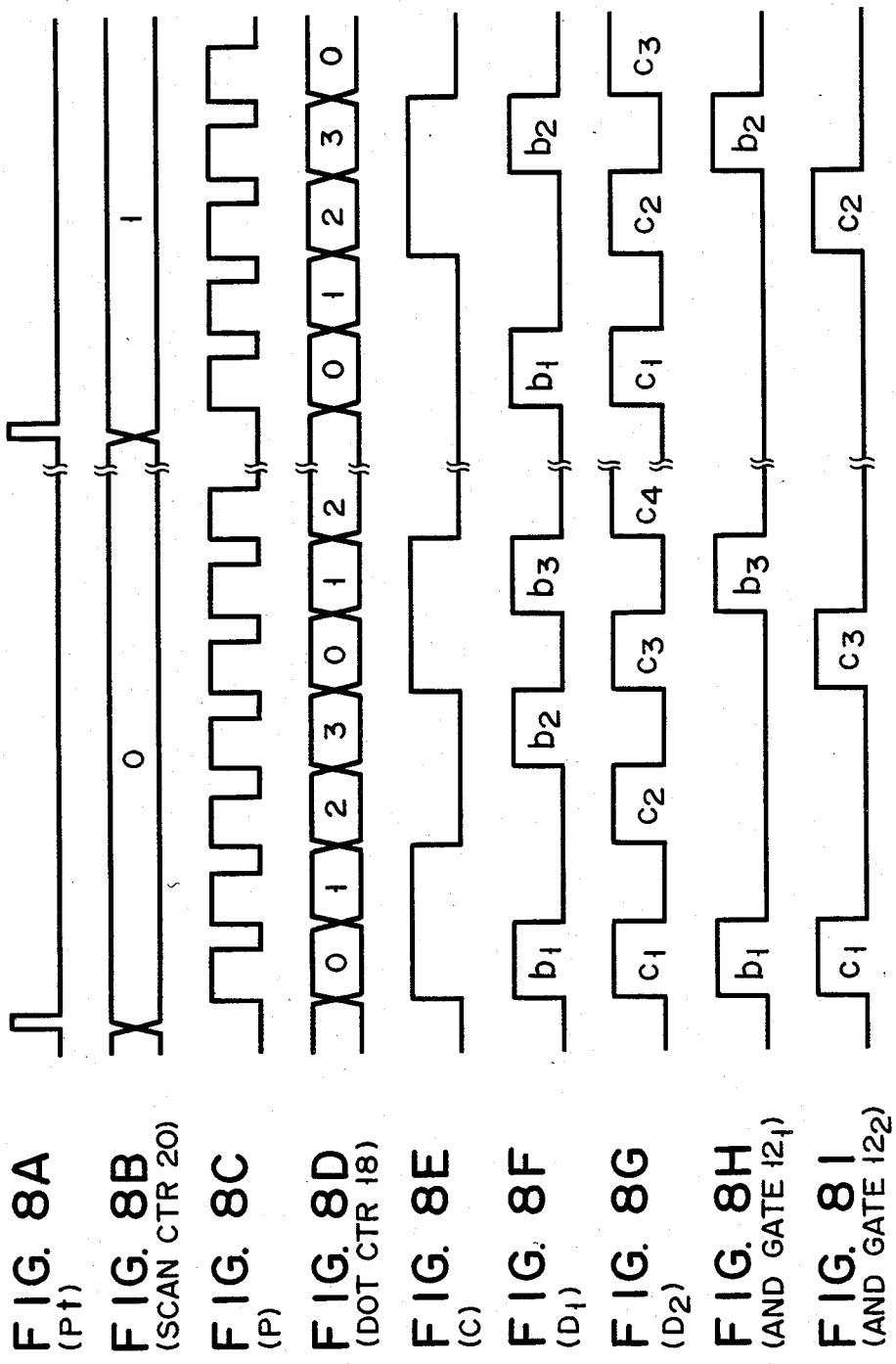

IMPACT DOT MATRIX PRINTER

BACKGROUND OF THE INVENTION

This invention relates to a serial type impact dot matrix printer which can print high density dot patterns such as drawing patterns.

A common example of an impact dot matrix printer of serial type is the so called wire dot type printer in which dot patterns of characters and drawings are printed, via an ink ribbon, by impact printing on a printing sheet. A print head, consisting of an array of dot pins constituted by wires arranged in a vertical direction, is moved along a horizontal direction. Of the dot patterns that are printed, an ordinary character dot pattern is a low density dot pattern in which the number of "off" dots which are not printed is greater than the number of "on" dots which are printed. On the other hand, a dot pattern of a drawing where all the dots in a dot matrix are printed, such as a bar of a bar graph, is a high density dot pattern. When such a high density dot pattern is printed more power is consumed for energizing solenoids for driving dot pins than in the case of printing a low density dot pattern of a character or the like, thus resulting in an overload on the power source circuit.

Heretofore, the increase of power consumption at the time of printing of a high density dot pattern has been prevented either by reducing the printing speed or by driving the dot pin array constituting the print head by multi-step printing. However, in the former method control of the carriage's speed of movement and, more fundamentally, adjustment of the motor control has been problematic because of the considerable change in the print head speed and, subsequently, printing speed between high density dot pattern printing and ordinary low density dot pattern printing.

In the latter method, the dot pin array is divided into, for instance, three sections such that not the whole dot pin array, but only a division thereof is driven in one cycle of the print head, thereby printing a one line dot pattern in three print head cycles. By this method the load on the power source is reduced, but a different problem of heat generation is posed. That is, during printing of a dot pattern representing a horizontal bar of a bar graph, dot pins are energized consecutively, although sectionally, so that at least a section of the print head is always hot.

SUMMARY OF THE INVENTION

An object of the invention is to provide an impact dot matrix printer of simple construction which can print a high density dot pattern without increasing power consumption.

Another object of the invention is to provide an impact dot matrix printer which can print a high density dot pattern without increasing the power consumption and without reducing the printing speed.

According to the invention there is provided an impact dot matrix printer comprising a print head reciprocatedly moved along a direction for printing a dot pattern consisting of a plurality of dots in a dot matrix, first detecting means for detecting the position of the print head in a reciprocating movement, second detecting means for detecting the number of reciprocating movements of the print head effected during printing of a one line dot pattern, means for judging whether to permit printing of a dot according to the outputs of said first and second detecting means, driver means for driving the print head according to the output of said judging means and printing data, and means for moving one of a printing sheet and the print head with respect to the other a predetermined extent in a direction perpendicular to said one direction of a reciprocating movement of the print head for every N (N being a positive integer) cycles of movement of the print head.

With the impact dot matrix printer according to the invention, a dot pattern for one line is divided into a plurality of sections along a horizontal direction, each section being printed in a separate cycle of print head movement. Consequently, it is possible to reduce the power consumption to one over the total number of the divided sections, as well as to print high density dot patterns without overloading the power source circuit.

BRIEF DESCRIPTION OF DRAWINGS

FIGS. 2A to 2G constitute a timing chart explaining the operation of the first embodiment;

FIG. 5 is a flow chart explaining the operation of the second embodiment;

FIGS. 8A to 8I constitute a timing chart explaining the operation of the third embodiment.

DETAILED DESCRIPTION OF THE PREFERRED EMBODIMENTS

Figure 1:
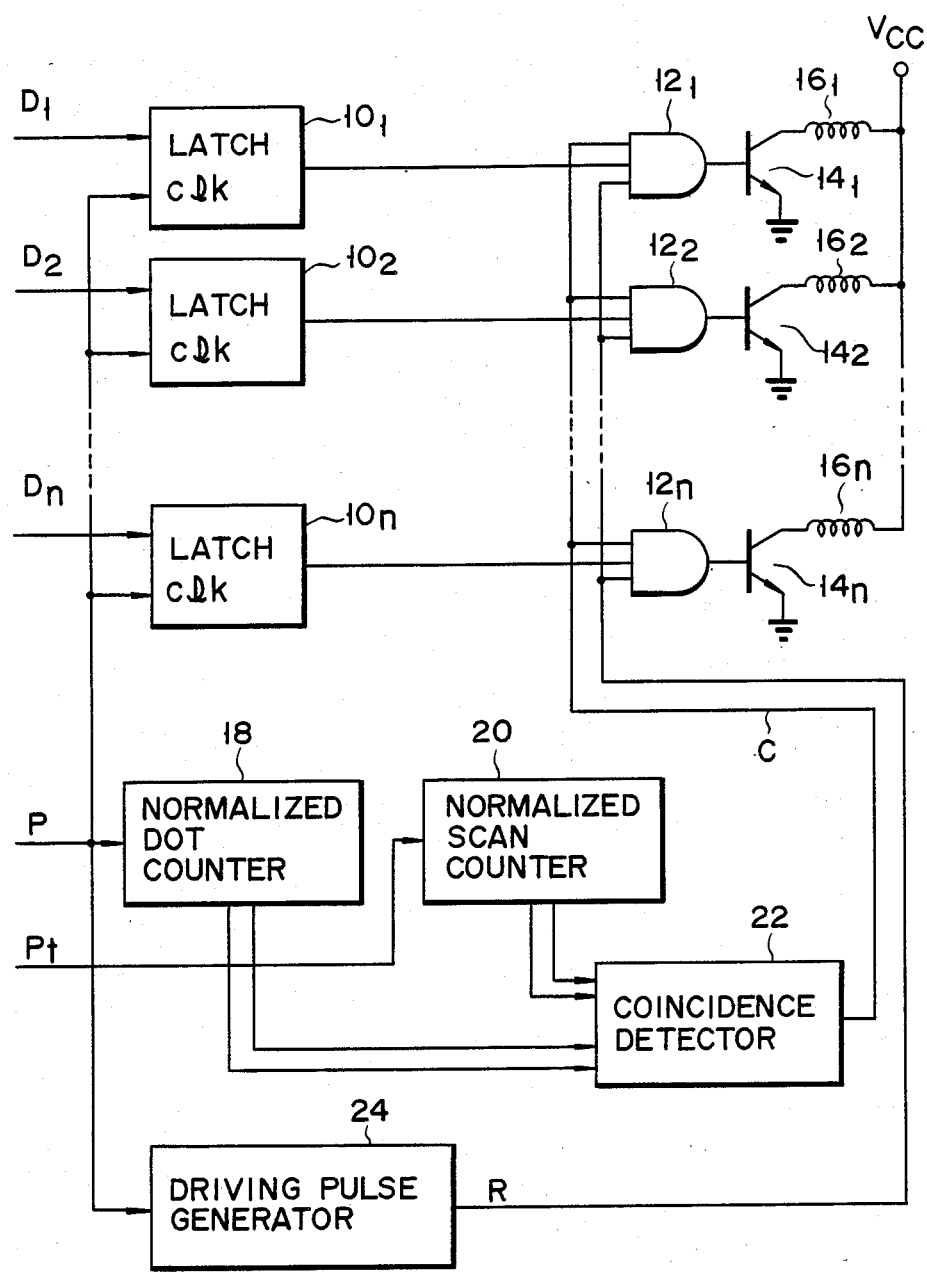
FIG. 1 is a schematic representation of a control circuit in a first embodiment of the impact dot matrix printer according to the invention.

Embodiments of the impact dot matrix printer according to the invention will now be described with reference to the drawings. FIG. 1 shows a printing control circuit of a first embodiment. The print head comprises n dot pins (consisting of wires) arranged in a column in a vertical direction, and faces a printing sheet via an ink carrier, e.g., an ink ribbon. While the print head is moved (scanned) by a carriage in a horizontal direction, the dot pins are energized and brought into contact with the printing sheet, whereby ink is transferred from the ink ribbon onto the printing sheet to effect printing of dots. When a dot pattern for one line has been printed, the printing sheet is fed by one line pitch in the vertical direction. Printing data $D_1$ to $D_n$ of the n dot pins are supplied to respective latches $10_1$ to $10_n$. A first timing signal P for determining the print timing is generated for each print dot position during the movement of the print head in the horizontal direction and fed to a clock terminal clk of the latches $10_1$ to $10_n$. The output data of the latches $10_1$ to $10_n$ are fed to a first input terminal of each of AND gates $12_1$ to $12_n$.

The first timing signal P is fed to a normalized dot counter 18 as well as to a driving pulse generator 24. The normalized dot counter 18 is a 2-bit modulo-3 ring counter. The modulo of the normalized dot counter 18 is equal to a multi-step printing division number according to the invention. A driving pulse signal R from the driving pulse generator 24 is fed to a second input terminal of each of the AND gates $12_1$ to $12_n$.

In this embodiment, a second timing signal Pt, consisting of pulses generated from the time the print head starts to move in the horizontal direction, is used in addition to the first timing signal P. The second timing signal Pt is fed to a normalized scan counter 20. The normalized scan counter 20 consists of a 2-bit modulo-3 ring counter in the same manner as the normalized dot counter 18.

The normalized dot counter 18 and normalized scan counter 20 provide, respectively, 2-bit data representing dot position, and a carriage movement cycle number normalized by 3. These output data are fed to a coincidence detector 22 which provides a coincidence signal C when both the input signals coincide. The coincidence signal C is then fed to a third input terminal of each of the AND gates $12_1$ to $12_n$.

The outputs of the AND gates $12_1$ to $12_n$ are fed to the base of each of transistors $14_1$ to $14_n$ which constitute the print head driving circuit. Solenoid coils $16_1$ to $16_n$, for energizing the dot pins of the print head, are each connected to the collectors of the transistors $14_1$ to $14_n$. When the transistors $14_1$ to $14_n$ are turned on driving current passes through the solenoid coils $16_1$ to $16_n$ to energize the dot pins of the print head. The dot pins are thus driven to strike the print sheet via the ink ribbon.

The operation of the first embodiment will now be described. While the usual low density dot pattern print is performed with a single print head cycle, as noted above, in the first embodiment a high density dot pattern is printed in three steps, i.e., three print head cycles. If the step number is N, the normalized dot counter 18 and normalized scan counter 20 are constituted by modulo-N ring counters. The judgement as to whether a dot pattern is of high density can be done by monitoring a power source circuit of the printer. For example, to determine whether print data is of a high density dot pattern, a check for reduction of either the power source voltage, due to overload, or of the average load current value is performed.

The second timing signal Pt is generated prior to each print head cycle, as shown in FIG. 2A. The normalized scan counter 20 is cleared by the first pulse of the second timing signal Pt. At this time, its count is reset to 0, as shown in FIG. 2B. After the print head has begun to move in the horizontal direction, the first timing signal P is generated at each instant corresponding to a position at which a matrix dot is to be printed, as shown in FIG. 2C. The count of the normalized dot counter 18 is progressively changed from 0, 1, 2, 0, 1, . . . according to the first timing signal P, as shown in FIG. 2D. The coincidence detector 22 provides a coincidence signal C when the outputs of the normalized dot counter 18 and normalized scan counter 20 coincide with each other. In other words, the coincidence signal C is provided while the output of the normalized dot counter 18 is 0, as shown in FIG. 2E. Since the normalized dot counter 18 is a modulo-3 counter, the coincidence signal C is generated for every three pulses from the first pulse of the first timing signal P in the first print head movement cycle, i.e., for every three dots from the first dot.

Meanwhile, a driving pulse signal R having a predetermined pulse width necessary for the driving of the solenoid coils $16_1$ to $16_n$ is fed from the driving pulse generator 24 to the AND gates $12_1$ to $12_n$ in synchronism with the first timing signal P, as shown in FIG. 2F. With the coincidence signal C fed to their third input terminal, the AND gates $12_1$ to $12_n$ can be enabled according to the printing data $D_1$ to $D_n$ from the latches $10_1$ to $10_n$ only during the period during which the coincidence signal C and driving pulse signal R are both supplied. The output of the AND gate $12_1$, when the printing data $D_1$ is all "on" dot data (for printing all dots), is shown in FIG. 2G.

When the first scan cycle ends with the printing head moved to the right side of the printing sheet, the carriage is returned. At the instant the first scanning cycle of the print head ends, however, the printing of all the dot pattern for one line has not yet been completed, so that vertical feeding of the printing sheet is not executed. Prior to the second cycle of the print head, the second timing signal Pt is generated, as shown in FIG. 2A. The count of the normalized scan counter 20 is, as shown in FIG. 2B, changed to 1 according to the second timing signal Pt. The normalized dot counter 18 operates in the same manner as described above. In this case, the coincidence signal C is provided while the output of the normalized dot counter 18 is 1. At this time, the dot printing is done. In other words, during the second print head cycle the coincidence signal C is provided for every three pulses from the second pulse of the first timing signal P, i.e., for every three dots from the second dot.

When the second scan cycle ends with the print head moved to the right side of the printing sheet, the carriage is returned. During the third print head movement cycle, the coincidence signal C is provided while the output of the normalized dot counter 18 is 2. At this time, the dot recording is done. In other words, during the third print head movement cycle, the coincidence signal C is provided for every three pulses from the third pulse of the first timing signal P, i.e., for every three dots from the third dot.

Figure 3A:
FIGS. 3A to 3C are views illustrating a process of the multi-step printing of a dot pattern in the first embodiment.
Figure 3B:
Figure 3C:
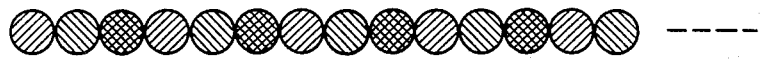

With this third scan cycle of the print head, all the dots of the one line dot pattern are formed. More specifically, with the first scan cycle of the print head, every third dot from the first dot is formed, as shown in FIG. 3A; with the second scan cycle every third dot from the second dot is formed, as shown in FIG. 3B; and with the third scan cycle every third dot from the third dot is formed, as shown in FIG. 3C. Generally, in the i-th (i being an integral number from 1 to N, where N is the step number) cycle of the print head, only dots for every N dots from the i-th dot in the i-th print head scanning cycle of a one line dot pattern can be printed.

It is to be noted that in the first embodiment a high density dot pattern is not printed with a single cycle of the print head, but, rather, is printed in three separate print head cycles as three divisions of the same horizontal dot pattern. Thus, power consumption can be reduced to one-third that of the prior art, thereby eliminating overload on the power source circuit. In addition, the speed of movement of the print head is fixed irrespective of variation of the dot density of the dot pattern. That is, control of the carriage speed is not a complicated problem. Further, the step number can be readily changed by changing the modulo of the normalized dot counter 18 and normalized scan counter 20.

Other embodiments of the invention will now be described.

Figure 4:
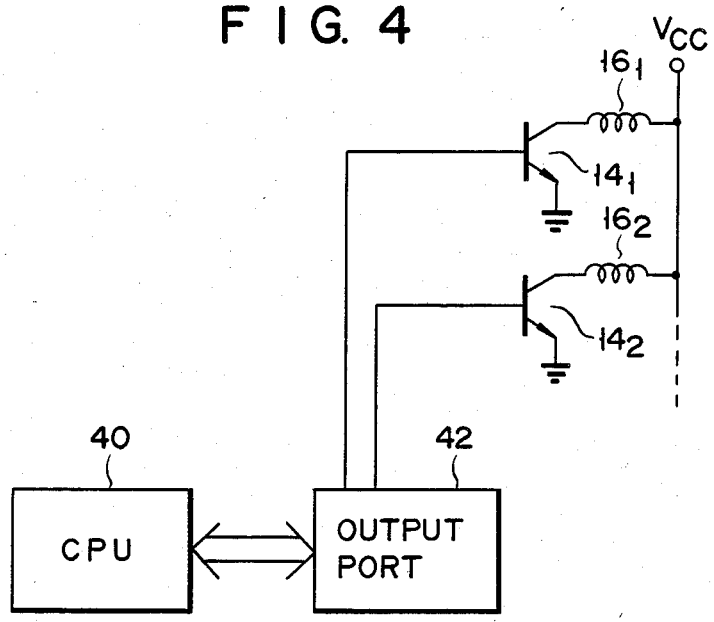
FIG. 4 is a schematic representation of a control circuit in a second embodiment of the impact dot matrix printer according to the invention.

FIG. 4 is a block diagram showing a control circuit of the second embodiment. In the second embodiment, the control of printing is done software-wise by a CPU.

More specifically, the output of a CPU 40 is fed through an output port 42 to the base of each of print head driving transistors $14_1$ to $14_n$.

The operation of the second embodiment will now be described with reference to the flow chart of FIG. 5. In this flow chart, the counters CTRA and CTRB correspond, respectively, to the normalized dot counter 18 and normalized scan counter 20. The counters CTRA and CTRB are incremented after the recording of one dot and at the end of one movement of the print head, respectively. In step S1, a check is done as to whether a print timing arrives, i.e., the timing of the rise of the edge of the driving pulse R synchronized with the first timing signal P in the first embodiment. Step S1 is executed repeatedly until the print timing arrives. When the print timing arrives, step S2, in which a check is performed to determine whether the data of the counters CTRA and CTRB coincide, is executed. If the data are coincident, step S3, in which print data is set to energize solenoid coils so as to drive dot pins, is executed. If the data do not coincide step S3 is skipped, and step S4, in which a check is performed to determine whether a reset timing arrives, i.e., the timing of the fall of the driving pulse P in the first embodiment arrives, is executed. Step S4 is executed repeatedly until the reset timing arrives. When the reset timing arrives, step S5, in which the print data is reset to stop energization of the solenoid coils, is executed.

After step S5 is executed, a step S6, in which a check is performed to determine whether the data of the counter CTRA is a predetermined value n (the value obtained by substituting one from the number of steps of multi-step driving; hence n=2, when the number of steps is 3), is executed. If the data is the predetermined value n, step S7, in which the counter CTRA is reset to 0, is executed. If the data is not the predetermined value n, step S8, in which the counter CTRA is increased by 1, is executed. Subsequent to the step S7 or S8, step S9, in which a check is performed to determine whether one scanning cycle of the print head is finished, such that the print head has been moved to the right side of the printing sheet, is executed.

If the scanning cycle is not over, the routine goes back to step S1. If the cycle is over, step S10, in which a check is performed to determine whether the data of the counter CTRB is the predetermined value n, is executed. If the data is not the predetermined value, step S11, in which the counter CTRB is increased by 1, is executed. Then step S12, in which the carriage is returned to bring the print head back to the initial position (i.e., the left side of the printing sheet), executed. If the data is the predetermined value n, step S13, in which the counter CTRB is reset to 0, is executed, thus terminating printing of the dot pattern for one line.

With the second embodiment, control similar to that in the first embodiment can be obtained. In the first embodiment all the printing data is latched, this latched data being fed to solenoid coils through AND gates controlled by the coincidence detector output. In the second embodiment, the outputs of latches are directly fed to the solenoid coils while the latching of data in the latches is controlled according to the coincidence detector output.

Figure 6:
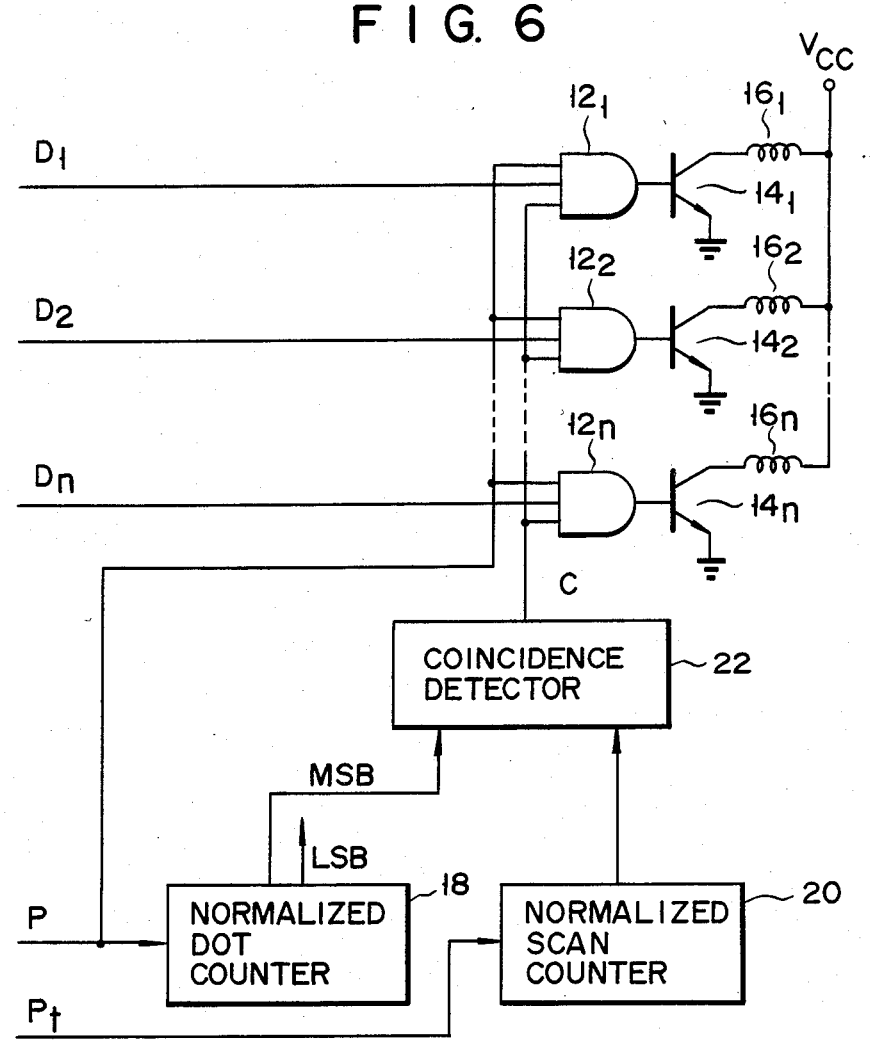
FIG. 6 is a schematic representation of a control circuit in a third embodiment of the impact dot matrix printer according to the invention.

FIG. 6 shows a control circuit of a third embodiment. In the Figure, parts corresponding to those in FIG. 1 are designated by like reference numerals. The third embodiment is the same as the first embodiment except for that the latches $10_1$ to $10_n$ and driving pulse generator 24 of the first embodiment are omitted. In the third embodiment, printing data $D_1$ to $D_n$ are fed to the first input terminals of AND gates $12_1$ to $12_n$. A first timing signal P corresponding to the driving pulse signal R in the first embodiment is fed to the second input terminals of AND gates $12_1$ to $12_n$ and to a normalized dot counter 18. A second timing signal Pt, which is the same as that in the first embodiment, is fed to a normalized scan counter 20. In the first embodiment, the modulo of the ring counters constituting the normalized dot counter 18 and normalized scan counter 20 were both equal to the step number of the multi-step printing. In the third embodiment, the modulo of the normalized scan counter 20 is the same as the step number, but the normalized dot counter 18 is a modulo-$2^m$ counter constituted by an m-bit ring counter, m being greater than the number of bits of the normalized scan counter 20 by 1. In the third embodiment the number of steps is 2, so the normalized scan counter 20 is constituted by a one-bit binary (modulo-2) ring counter and the normalized dot counter 18 by a 2-bit modulo-4 ring counter.

The sole upper one bit (MSB) of the output of the normalized dot counter 18, together with the one-bit output data of the normalized scan counter 20 are fed to a coincidence detector 22. When its two inputs coincide, the coincidence detector 22 provides a coincidence signal C which is fed to the third input terminals of AND gates $12_1$ to $12_n$.

The outputs of the AND gates $12_1$ to $12_n$ are fed to the bases of transistors $14_1$ to $14_n$. Solenoid coils $16_1$ to $16_n$ are each connected to the collectors of the transistors $14_1$ to $14_n$.

Prior to describing the operation of the third embodiment, the printing speed of the impact dot matrix printer will be described. The impact dot matrix printer has a normal printing mode and a high speed printing mode where dot pitch is constant.

In the normal printing mode, dots are printed in one-to-one correspondence to dot positions on the printing sheet. In this mode, the dot pins are driven while the print head is moves in accordance with the dot pitch (e.g., 1/180 inch).

In the high speed printing mode only a character pattern of a nature such that dot data is always 0, i.e., no dot is formed, when the print head is moved by one dot pitch after the formation of a dot, is printed. That is, the high speed printing mode is effective only for a character pattern where two immediately adjacent dots are never formed. In the impact dot matrix printer, the frequency with which solenoid coils are driven to energize the dot pins can be reduced only within limits, there being an upper limit of dot pin response frequency. Therefore, the minimum time interval from the formation of one dot till the formation of the next dot is fixed. Since no two consecutive dots are formed within a constant dot pitch, the speed of the print head in the high speed printing mode may be double the speed in the normal printing mode; that is, in the high speed printing mode the dot pin response frequency may be virtually double the frequency in the normal printing mode. In practice, the dot pin response frequency in the high speed printing mode remains the same as that in the normal printing mode, provided no adjacent dots are formed. At this time, by doubling the speed of movement of the print head the dot pitch remains at 1/180 inch. Therefore, printing can be effected at double the speed of the normal printing mode while maintaining the same character width. The print quality, however, is inferior to that in the normal printing mode because there are no adjacent dots.

Figure 7:
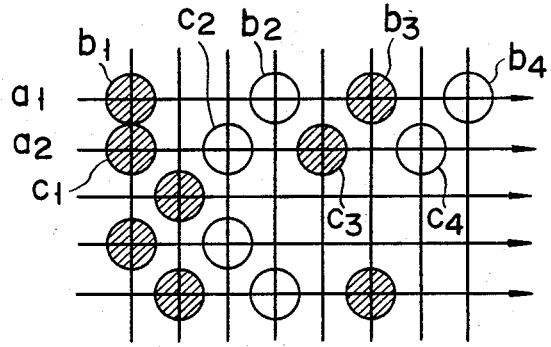
FIG. 7 is a view showing an example of the print of a dot pattern obtained with the third embodiment.

The third embodiment is directed to the high speed printing mode. FIG. 7 shows an example of a print pattern obtained with the third embodiment. This print pattern features the absence of adjacent dots.

The operation of printing the dot pattern shown in FIG. 7 will now be described with reference to the timing chart of FIGS. 8A to 8I.

Prior to the movement of the print head in each cycle, the second timing signal Pt is generated as shown in FIG. 8A. The normalized scan counter 20 is cleared by the first pulse of the second timing signal Pt. Its count is thus reset to 0, as shown in FIG. 2B, and movement of the print head in the horizontal direction begins. The first timing signal P is generated at an instant corresponding to the position of each dot to be printed, as shown in FIG. 8C. The count of the 2-bit normalized dot counter 18 is progressively changed from 0 (00), 1 (01), 2 (10), 3 (11), 0 (00), 1 (01), . . . according to the first timing signal P, as shown in FIG. 8D, the figure in parentheses being a binary number. The coincidence detector 22 provides a coincidence signal C when the upper one bit of the output of the normalized dot counter 18 and one-bit output data of the normalized scan counter 20 coincide with each other. That is, the coincidence signal C is provided while the output of the normalized dot counter 18 is 0 (00) and 1 (00). Since the normalized dot counter 18 is a modulo-4 counter, the coincidence signal C is provided for every four pulses starting with the first pulse of the first timing signal P, i.e., for every four dots starting with the first dot. It is also provided for a period covering two pulses of the first timing signal P, i.e., covering two dots.

FIGS. 8F and 8G show printing data $D_1$ and $D_2$ of the lines $a_1$ and $a_2$ in FIG. 7, respectively. Thus, in the first cycle of the print head, only dots $b_1$, $b_3$; $c_1$ and $c_3$ are printed as shown in FIGS. 8H and 8I. The dots which are printed in the first cycle of movement of the print head are shown as shaded circles in FIG. 7.

When the first scanning cycle ends with the print head moved to the right side of the printing sheet, the carriage is returned to the left side. At this time, printing of the entire dot pattern for one line has not yet been completed; therefore, the printing sheet is not fed in the vertical direction. Prior to the second cycle of the print head, the second timing signal Pt is generated as shown in FIG. 8A. The normalized scan counter 20 is incremented according to the second timing signal Pt, with its count becoming 1 as shown in FIG. 8B. The normalized dot counter 18 operates on this occasion in the same way as previously, and provides a coincidence signal C when the output of the normalized dot counter 18 is 2 (10) and 3 (11). That is, the coincidence signal C is provided for every four pulses starting with the third pulse of the first timing signal P, i.e., for every four dots starting with the third dot, but for a period covering only two pulses, i.e., covering two dots. Thus, in the second cycle of the print head dots $b_2$ and $c_2$ are printed as shown in FIGS. 8H and 8I. The dots that are printed in the second print head cycle are shown as non-shaded circles in FIG. 7. Generally, in the i-th (i being an integral number from 1 to N, N: the step number) cycle of the print head and during recording of a dot pattern for one line, only $\{2(i-1)+1\}$-th and $\{2(i-1)+2\}$-th dots for every $2^N$ dots in the i-th cycle of the print head during printing of a one line dot pattern can be printed.

In the third embodiment, the print head's speed of movement is doubled compared to that of the first embodiment. Thus, if the step number is 2, a high density dot pattern can be printed without reducing the printing speed to a speed comparable to that used in normal low density dot pattern printing. In the case of the 1st and 2nd embodiments, high density dot pattern printing require a time period greater than required in the case of normal low density, printing by the step multiplied by the time period needed for normal low density printing.

As has been described in the foregoing, with the impact dot matrix printer according to the invention a dot pattern is printed horizontally and in stages as a plurality of sections through a corresponding number of print head cycles. Thus, power consumption can be reduced to one over the number of the divided sections, and a high density dot pattern can be printed without overloading the power source circuit. The embodiments of the invention described above are by no means limitative and it is possible to vary the step number.

What is claimed is:
1. An impact dot matrix printer comprising:
   a print head reciprocatedly moved along a direction for printing a dot pattern consisting of a plurality of dots in a dot matrix;
   first detecting means for detecting the position of the print head in a reciprocating movement;
   second detecting means for detecting the number of reciprocating movements of the print head effected during printing of a dot pattern for one line;
   means for judging whether to permit printing of a dot according to the outputs of said first and second detecting means;
   driver means for driving the print head according to the output of said judging means and printing data; and
   means for moving one of a printing sheet and the print head with respect to the other a predetermined extent in a direction perpendicular to said one direction of a reciprocating movement of the print head for every N, N being a positive integer larger than or equal to 2, cycle of movement of the print head.

2. The impact dot matrix printer according to claim 1, in which said judging means cyclically permits and prohibits printing of dots.

3. The impact dot matrix printer according to claim 2, in which said judging means permits printing of dots for every N dot from the i-th dot (i being an integer selected from 1 to N) in the i-th print head scanning cycle during printing of a one line dot pattern.

4. The impact dot matrix printer according to claim 3, in which said first detecting means is a modulo-N ring counter for counting first timing signal pulses supplied according to dot print timings.

5. The impact dot matrix printer according to claim 3, in which said second detecting means is a modulo-N ring counter for counting second timing signal pulses supplied for each cycle of the reciprocating movement of the print head.

6. The impact dot matrix printer according to claim 3, in which said judging means is a coincidence detector for comparing the outputs of said first and second detecting means and providing a permit signal when the two inputs coincide.

7. The impact dot matrix printer according to claim 2, in which:

said print head faces the printing sheet via an ink ribbon, consists of an array of dot pins constituted by wires arranged in a vertical direction, and is reciprocatedly moved along a horizontal direction; and said driver means includes latches for latching printing data according to first timing signal pulses provided according to dot print timings, AND gates supplied with printing data provided from said latches, a first timing signal pulse and the output of said judging means, solenoid coils for causing dot pins to strike a printing sheet via an ink ribbon, and drivers for driving solenoid coils according to the output of said AND gates.

8. The impact dot matrix printer according to claim 2, in which said print head faces the printing sheet via the ink ribbon, consists of an array of dot pins constituted by wires arranged in a vertical direction, and is reciprocately moved along a horizontal direction, and said driver means reads out the output of said judging means according to a print timing, sets printing data according to the readout output to energize a dot pin so as to cause it to strike the printing sheet, and resets the data which was set according to a reset timing to thereby stop energization of the dot pin.

9. The impact dot matrix printer according to claim 2, in which said print head prints only dot patterns not having two dots immediately adjacent to one another in said direction, and said judging means permits printing of $\{2(i-1)+1\}$-th and $\{2(i-1)+2\}$-th dots (i being an integer from 1 to N) for every $2^N$ dots in the i-th cycle of the print head during printing of a one line dot pattern.

10. The impact dot matrix printer according to claim 9, in which said first detecting means is an N-bit modulo-$2^N$ counter for counting first timing signal pulses supplied according to dot print timings.

11. The impact dot matrix printer according to claim 10, in which said second detecting means is a modulo-N ring counter for counting second timing signal pulses supplied for each cycle of movement of the print head.

12. The impact dot matrix printer according to claim 11, in which said judging means is a coincidence detector for comparing the output of said second detecting means and the upper bits of the output of said first detecting means corresponding in number to the number of bits of the output of said second detecting means.

* * * * *